Aug. 19, 1941.   C. LYNN   2,253,340
VOLTAGE CONTROL OF DIRECT-CURRENT GENERATORS
Filed July 9, 1938

WITNESSES:
C. J. Weller.
F. P. Lyle

INVENTOR
Clarence Lynn.
BY O. B. Buchanan
ATTORNEY

Patented Aug. 19, 1941

2,253,340

UNITED STATES PATENT OFFICE 2,253,340

VOLTAGE CONTROL OF DIRECT-CURRENT GENERATORS

Clarence Lynn, Pittsburgh, Pa., assignor to Westinghouse Electric & Manufacturing Company, East Pittsburgh, Pa., a corporation of Pennsylvania Application July 9, 1938, Serial No. 218,309

12 Claims. (Cl. 171—223)

The present invention relates to direct-current generators, and, more particularly, to an arrangement for controlling the voltage of such generators.

In many cases, it is desirable to control the voltage of a generator in order to control the speed of a motor supplied from the generator and operating at relatively low speeds. For example, there are certain types of hoists which handle different materials at different times but must always be operated at a definite low speed and, by properly controlling the voltage supplied to the hoist motor, it is possible to operate the motor at the same low speed with different loads. In such cases, it is usually desirable also to maintain an approximately constant value, or at least a relatively high value, of the stall current or maximum short-circuit current of the generator.

One type of direct-current generator which can be readily adapted for operation in this way is the so-called "shovel-type" generator, which is often used on electric shovel applications. A generator of this type has a field excitation system which comprises three field windings on each of the main pole pieces, a self-excited shunt field winding, a separately excited shunt field winding, and a differential series field winding which usually consists of a few turns of copper strap, so that it has a relatively low resistance. By properly proportioning the relative strengths of these three windings, it is possible to obtain voltage regulation curves which do not drop off too rapidly up to load currents in the neighborhood of rated load but still give a value of stall current which is not too high compared with the full load current; i. e., in the neighborhood of 1 to 3 times rated current. A generator of this type can be readily adapted, by using the arrangement of the present invention, to maintain a constant value of stall current while the no-load voltage is varied over a considerable range, or to obtain predetermined values of stall current as the no-load voltage is varied.

The object of the invention, therefore, is to provide a direct-current generator in which the no-load voltage can be varied while the maximum short-circuit current is maintained constant.

A more specific object of the invention is to provide a direct-current generator having a self-excited shunt field, a separately excited shunt field, and a differential series or compound field, in which the relative strengths of the field windings can be varied so as to control the voltage of the generator while maintaining the maximum short-circuit current constant, or obtaining any desired variation of the maximum current.

These objects are attained by replacing the usual strap wound differential series or compound field winding by a wire wound field winding which is excited from a series exciter, and providing rheostats in the differential compound field circuit and the separately excited field circuit which are mechanically connected together so that the strengths of the two fields can be simultaneously varied without changing their relation to each other. In this way the maximum short-circuit current can be kept constant while the no-load voltage is varied. As a further possibility, the self-excited field rheostat may be connected to the other two rheostats so that all three components of the generator field can be simultaneously varied to obtain any desired relation of the maximum current and no-load voltage.

The invention will be more fully understood from the following detailed description taken in conjunction with the accompanying drawing, in which.

Figure 2:
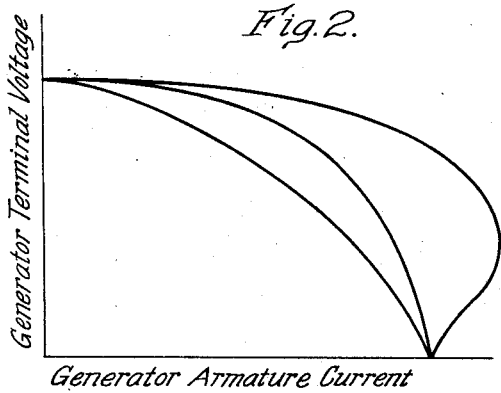
Figs. 2 and 3 are curves showing the characteristics of a generator of the type described herein.

As explained above, the present invention relates to a generator of the so-called "shovel type," which has a separately excited shunt field, a self-excited shunt field and a differential series or compound field winding. By properly proportioning the relative strengths of these three field windings, it is possible to obtain voltage regulation curves such as shown in Fig. 2, from which it will be seen that various voltage characteristics can be obtained with the same no-load voltage and maximum short-circuited current. By varying the relative strengths of the self-excited and separately excited shunt field windings, the maximum current and no-load voltage can be changed and families of curves of this general type can be obtained.

Figure 3:
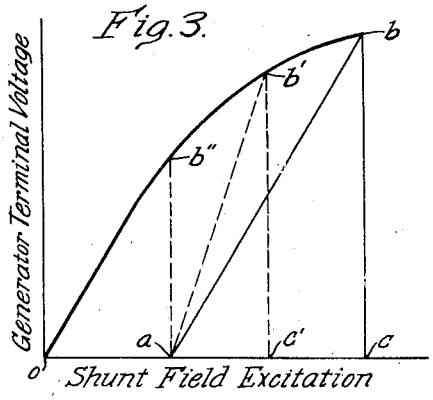

The no-load voltage can be varied within certain limits without changing the maximum current by varying the strength of the self-excited shunt field, and the range of variation of the no-load voltage can be increased by varying the separately excited shunt field. When this is done, however, the differential compound field must be correspondingly varied in order to maintain a constant value of maximum short-circuit current. The reason for this will be more clearly seen from Fig. 3, which shows a saturation curve for a generator of this type. In this figure, the line $ab$ represents the combined excitation of the self-excited and separately excited shunt field windings. The distance $oa$ represents the separately excited field winding excitation while the distance $ac$ represents the self-excited field excitation which is proportional to the terminal voltage of the generator. The distance $oc$ therefore, represents the combined excitation of these two field windings when the generator voltage has the value $bc$. In the self-excited shunt field excitation is reduced to a value such as $ac'$ by introducing resistance in its circuit, the combined excitation will have the value represented by $oc'$ and the generator voltage will be $b'c'$. If the self-excited field excitation is still further reduced by increasing the resistance in the circuit, the combined excitation will finally reach a value represented by $oa$ when the resistance becomes infinite, i. e., when the circuit is opened. The corresponding generator voltage $ab''$ is, therefore, the lowest value of no-load voltage that can be obtained by adjustment of the self-excited shunt field alone. This variation of the self-excited field does not affect the value of the maximum or stall current since the self-excitation becomes zero under short-circuit conditions when the terminal voltage is zero.

To obtain lower values of the no-load voltage, it is necessary to reduce the excitation of the separately excited field. When this is done, however, the value of the maximum current will be changed because it depends upon the relation of the differential compound field and the separately excited shunt field. In order to keep the maximum or stall current at a constant value, therefore, it is necessary to vary the strength of the differential compound field winding as the separately excited shunt field winding is varied so that the same relation is maintained between them throughout the range of adjustment.

This adjustment of the differential series or compound field winding can be carried out in various ways. For example, with the conventional strap wound differential series field, an adjustable shunt may be provided to weaken the series field as the separately excited field is weakened. This is not a desirable arrangement, however, because the strap wound field has low resistance and the contact resistance of the switches and connections of the shunt would be an appreciable part of the total resistance of the shunt circuit. Since this contact resistance would not necessarily be constant, the resistance of the series field circuit would vary from time to time, giving unsatisfactory performance. Also, since relatively high values of current would be shunted from the differential series field, only a few steps of adjustment could be provided.

Figure 1:
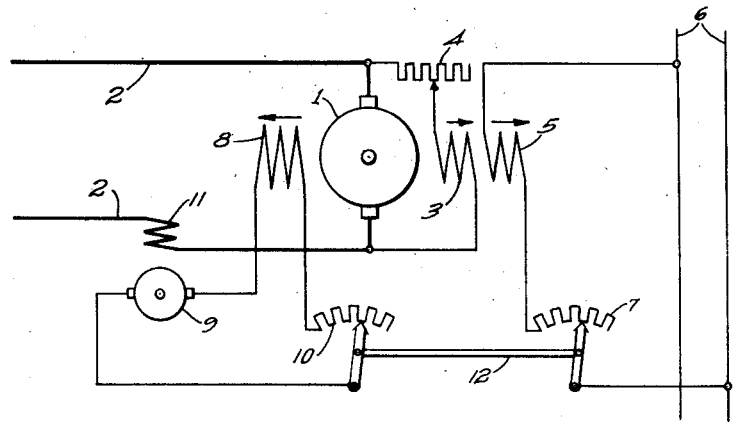
Figure 1 is a diagram showing one embodiment of the invention.

A preferred embodiment of the invention is shown in Fig. 1, which shows a generator having an armature 1 of any suitable type connected to an external load by conductors 2. The main poles of this generator are provided with three field windings as explained above. The self-excited shunt field winding is indicated at 3 and, if desired, a field rheostat 4 may be connected in series with this winding to adjust its excitation. The separately excited shunt field winding 5 is connected to any suitable source of substantially constant direct current, indicated at 6, through a rheostat 7. The differentially connected compound winding 8 is made of a large number of turns of wire, instead of a few turns of heavy copper strap. It is supplied by an exciter 9, which may conveniently be driven from the shaft of the main generator 1, and a suitable rheostat 10 is connected in series with the winding 8. The exciter 9 has a field winding 11, composed of a few turns of heavy wire, which is connected in series with the generator 1. In order to obtain simultaneous adjustment of the separately excited and compound field windings, a mechanical connection indicated at 12 is provided between the rheostats 7 and 10. Any suitable arrangement may be used for connecting these rheostats together to insure their simultaneous operation. Thus, a simple mechanical linkage may be used, as indicated on the drawing, the rheostat arms may be mounted on a common shaft, or any other means may be employed to insure that the excitations of the two field windings will be changed correspondingly so that their relation will remain the same.

It will be seen that with this arrangement, the no-load voltage of the generator can be controlled within wide limits by successively varying the excitation of the self-excited shunt field and of the separately excited shunt field, and that when the separately excited shunt field excitation is changed, the differential compound field will be correspondingly changed, so that their relation will remain the same and the maximum short-circuit current will be kept constant, as explained above in connection with Fig. 3.

In some cases it may not be necessary or desirable to keep the maximum current constant, but in such cases it is usually desirable to have a predetermined and relatively high value of maximum current for each value of no-load voltage. This may be obtained by adjusting the connection between the rheostats in such a manner that the relation between the strengths of the separately excited and compound field windings will be changed in a predetermined manner as the excitation is varied. In this way the value of the maximum current can be either increased or decreased with change in the no-load voltage.

Figure 4:
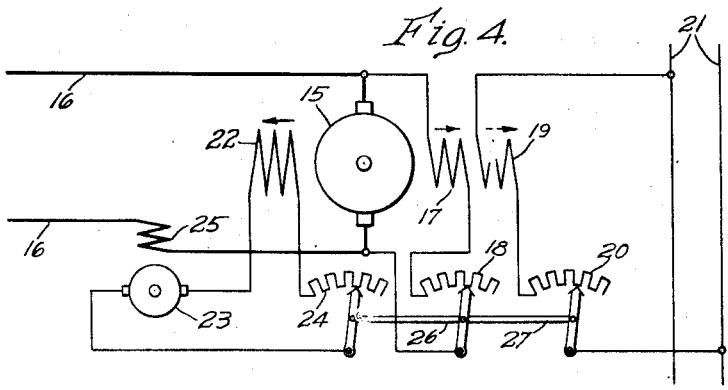
Fig. 4 is a diagram showing a further embodiment of the invention.

In case a still further range of adjustments is desired, the arrangement shown in Fig. 4 can be used. This figure shows a generator 15 connected to an external load by conductors 16. This generator, as before, has three field windings. A self-excited shunt field winding 17 is connected to the generator through a rheostat 18; a separately excited shunt field winding 19 is connected through a rheostat 20 to an external source of direct current 21; a differential compound field winding 22 is supplied from an exciter 23 through a rheostat 24, and the exciter field 25 is connected in series with the generator 15. It will be seen that this arrangement of field windings is similar to that shown in Fig. 1. In this case, however, all three of the rheostats 18, 20 and 24 are connected together by mechanical connections 26 and 27, so that the three field windings may be varied simultaneously. By using this arrangement and adjusting the rheostats so that the relations between the field windings are properly varied, any desired relation between the no-load voltage and the maximum current can be obtained and in this way a very flexible system is provided which gives a very wide range of control of the no-load voltage and maximum current of the generator, and also control of the shape of the voltage regulation curve between no load and stall current, even when the generator voltage is negative or the current reversed for motoring. It will be understood, of course, that any suitable type of mechanical connection between the rheostats can be used to vary excitation of the field windings with respect to each other in the desired manner.

It will be seen, therefore, that an arrangement has been provided for controlling the voltage of a direct-current generator which makes possible a wide range of control of the voltage while the maximum short-circuit current is kept constant, and also that by using this arrangement it is possible to secure any desired relation between the no-load voltage and the maximum current or that the maximum current can be varied in any desired manner as the no-load voltage is changed. This arrangement also permits controlling the shape of the voltage regulation curve.

It is to be understood that although certain specific embodiments of the invention have been shown and described, these embodiments are illustrative only and that other similar arrangements could be used for maintaining a constant relation between the separately excited shunt and differential compound field windings while their excitations are varied, or for obtaining any desired variation in the relation of their excitations. The invention, therefore, is not limited to the specific arrangements shown, but in its broadest aspects, it includes all equivalent embodiments and modifications which come within the scope of the appended claims.

I claim as my invention:

1. A direct-current generator having a field excitation which includes a component directly proportional to the generator terminal voltage, a component independent of the generator voltage and a component proportional to the generator load current, the last-mentioned component being opposed to the first two components, and means for controlling the no-load voltage of the generator comprising means for varying the two last-mentioned components of the field excitation while keeping their relation to each other unchanged, whereby the maximum short-circuit current of the generator remains constant.

2. A direct-current generator having a field excitation which includes a component directly proportional to the generator terminal voltage, a component independent of the generator voltage and a component proportional to the generator load current, the last-mentioned component being opposed to the first two components, and means for controlling the no-load voltage of the generator comprising means for simultaneously varying the two last-mentioned components without changing their relation to each other, whereby the maximum short-circuit current of the generator remains constant.

3. A direct-current generator having a field excitation which includes a component directly proportional to the generator terminal voltage, a component independent of the generator voltage and a component proportional to the generator load current, the last-mentioned component being opposed to the first two components, and means for controlling the no-load voltage of the generator comprising means for simultaneously varying the two last-mentioned components while maintaining a predetermined relation between them.

4. A direct-current generator having a field excitation which includes a component directly proportional to the generator terminal voltage, a component independent of the generator voltage and a component proportional to the generator load current, the last-mentioned component being opposed to the first two components, and means for controlling the no-load voltage of the generator comprising means for simultaneously varying at least two of said components while maintaining a predetermined relation between them, whereby a desired value of maximum short-circuit current of the generator is obtained.

5. In a direct-current generator, a field winding excited only by the generator voltage, a separately excited field winding, a differential compound field winding, and means for simultaneously varying the excitation of the separately excited and compound field windings to control the no-load generator voltage without changing the maximum short-circuit current.

6. In a direct-current generator, a field winding excited only by the generator voltage, a separately excited field winding, a differential compound field winding, and means for simultaneously varying the excitation of the separately excited and compound field windings while maintaining their relation to each other unchanged to control the no-load generator voltage without changing the maximum short-circuit current.

7. In a direct-current generator, a field winding excited only by the generator voltage, a separately excited field winding, a differential compound field winding, means for simultaneously varying the excitation of the separately excited and compound field windings, and means for independently varying the excitation of the self-excited field winding.

8. In a direct-current generator, a field winding excited only by the generator voltage, a separately excited field winding, a differential compound field winding, rheostats connected in series with the separately excited and compound field windings, and a mechanical connection between said rheostats whereby they may be simultaneously adjusted.

9. In a direct-current generator, a field winding excited only by the generator voltage, a separately excited field winding, a differential compound field winding, rheostats connected in series with each of said field windings, and mechanical connections between the rheostats so that the excitations of the field windings may be simultaneously varied.

10. In a direct-current generator, a field winding excited only by the generator voltage, a separately excited field winding, a differential compound field winding, rheostats connected in series with each of said field windings, and mechanical connections between the rheostats so that the excitations of the field windings may be simultaneously varied, said rheostats being so proportioned that the simultaneous variation of the excitations of the field windings effects desired changes in the relation of generator voltage to armature current throughout the range from no load to full load.

11. A direct-current generator having a field winding excited only by the generator voltage, a separately excited field winding, and a differential compound field winding, an exciter connected to supply exciting current to the compound field winding, said exciter having a field winding connected in series with the generator, and means for simultaneously varying the excitation of said separately excited and compound field windings.

12. A direct-current generator having a field winding excited only by the generator voltage, a separately excited field winding, and a differential compound field winding, an exciter connected to supply exciting current to the compound field winding, said exciter having a field winding connected in series with the generator, and means for simultaneously varying the excitation of said separately excited and compound field windings while maintaining their relation to each other unchanged.

CLARENCE LYNN.